March 15, 1966  J. R. DUKES ETAL  3,240,940
FLUTTER-INSENSITIVE GEOMETRY FOR RADIATION
GAUGING OF ROD-LIKE OBJECTS
Filed Dec. 19, 1961  2 Sheets-Sheet 1

INVENTORS
JOHN R. DUKES
DENMAN K. ALLEMANG

ATTORNEY

March 15, 1966 J. R. DUKES ETAL 3,240,940
FLUTTER-INSENSITIVE GEOMETRY FOR RADIATION
GAUGING OF ROD-LIKE OBJECTS
Filed Dec. 19, 1961 2 Sheets-Sheet 2

INVENTORS
JOHN R. DUKES
DENMAN K. ALLEMANG

ATTORNEY

United States Patent Office 3,240,940
Patented Mar. 15, 1966

3,240,940
FLUTTER-INSENSITIVE GEOMETRY FOR RADIATION GAUGING OF ROD-LIKE OBJECTS
John R. Dukes and Denman K. Allemang, both of Columbus, Ohio, assignors to Industrial Nucleonics Corporation, a corporation of Ohio
Filed Dec. 19, 1961, Ser. No. 160,604
4 Claims. (Cl. 250—83.3)

This invention relates to a nuclear radiation gauge for measuring the properties of materials, and more particularly it relates to a method and means for minimizing the effects of "flutter" as hereinafter explained on the reading of such an instrument when the same is utilized for measuring traveling materials in the form of rods, strands, bundles of fibers and the like.

The invention is herein illustrated and described in connection with the design and use of a gauge for measuring the weight per unit length of a continuous cigarette rod issuing from the rod-forming mechanism of a cigarette maker. In this application of the instrument, which may be as described in Patent No. 2,954,775, the traveling cigarette rod is guided in measuring relation to a nuclear beta radiation source and a radiation detector.

In the design of such an instrument, it has been found practically impossible to achieve a perfectly uniform, homogeneous radiation field across the path of the rod. For this reason, if there is lateral movement of the rod, that is, movement in any direction transverse to the axial travel thereof through the measuring system, an effect called "flutter" has tended to alter the detector output, producing an erroneous indication of a change in weight per unit length.

In an attempt to eliminate the undesirable flutter effect, it has been proposed, for example, in Patent No. 2,757,675, to eliminate all lateral movement of the rod in the measuring zone by providing a stationary rod guide in tight frictional engagement with the cigarette rod. This expedient, however, risks damage to the delicate, fast-traveling rod and jamming thereof in the guides in the event the rod should become temporarily oversize. Moreover, such guides constitute the basic collimating aperture for the radiation beam, and the abrasive action of the rod tends to wear away the surfaces of the guides, thus altering the fixed geometry of the measuring zone to the detriment of the instrument calibration.

It has also been proposed, in Patent No. 2,999,932, to provide, with a rod guide or pass tube system adapted for free movement of the rod therethrough, an empirically-shaped radiation aperture defining means adjacent to the detector, having suitably proportioned radiation absorbing and reflecting portions whereby the apparent radiation absorption by the rod as "seen" by the detector remains substantially constant despite the permitted flutter movement of the rod. This arrangement, however, has utilized a radiation source having radioactive material deposited over an extended area of the deposition base within the source assembly, and it is found that the radioactivity of the deposit unfortunately is seldom perfectly uniform over such area. On the contrary, it must be expected that the radiation emission from the deposit will be characterized by localized regions of high intensity and low intensity, whereby the radiation beam traversing the pass tube and incident on the detector is subject to "hot spots." When such hot spots are variably "covered" and "uncovered" by the laterally shifting or vibrating mass of the rod, the unwanted flutter effect is apt to appear in spite of the absorber-reflector geometry, unless the dimensions and location of each aperture are individually tailored, by cut-and-try methods, to the requirements of a particular radiation source, thus increasing the cost, in time and labor, of manufacturing each instrument.

In accordance with this invention, there is provided a measurement geometry incorporating a so-called line source of radiation, wherein a radioactive material is encapsulated in a container having the shape of a needle or straight wire segment. The line source is located on one side of the cigarette rod in a plane whose locus is the nominal axis of travel of the rod, and a radiation detector is located on the diametrically opposite side thereof, with this arrangement, by virtue of the vanishingly small cross-section of the line source, the radiation beam is basically symmetrical about the plane aforesaid, even though local variations may still obtain in the concentration of the radioactive material along the length of the line source. While the detector output still varies as a function of the displacement of the cigarette rod from its normal axis of travel, the variation is relatively small. Moreover, since the detector output function resembles a parabola having a point of zero slope when the rod axis coincides with the nominal axis of travel, an optimum "flutter tuning" is almost automatically achieved.

In a commercial gauging instrument, this ideal situation is complicated by the usual requirements for features such as shielding, radiation collimating slots, radiation shutters and mounting arrangements therefor, and integral barriers such as "pass tubes" for isolating the radioactive source from the region traversed by the measured product. These devices introduce various effects of absorption, reflection, and multiple scattering on the radiation beam, and tend to alter the basic symmetry of the line source geometry. However, in accordance with this invention, any change in the basic flutter tuning introduced by these variables can be easily corrected by the simple expedient of making a slight adjustment to the position of the line source.

Accordingly it is the object of the present invention to provide a simple, inexpensive and reliable method and means for minimizing the flutter effect on instruments of the type described.

It is also an object to provide a radiation gauge geometry which is adapted for measurement of different sizes, shapes and compositions of rod-like articles without the necessity for replacement or redesign of parts constituting said geometry.

It is another object to provide such a radiation geometry whereby optimum flutter tuning for different measurement parameters can be achieved by a simple positioning adjustment.

Further objects and advantages of the present invention will become apparent in the following detailed description of one preferred apparatus and flutter tuning procedure, taken in conjunction with the appended drawings, in which.

Figure 1:
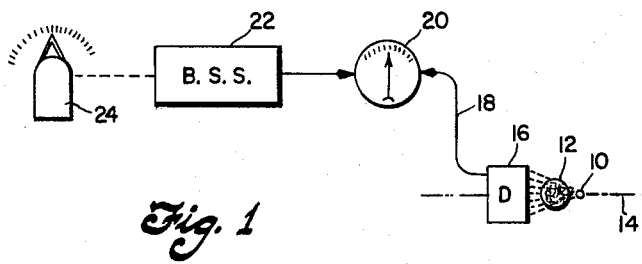
FIG. 1 is a schematic showing of a basic radiation gauge apparatus in accordance with the invention.

Referring now to FIG. 1, a line source 10 of nuclear radiation is located on one side of a rod-shaped workpiece 12, hereinafter designated simply as the rod, in a plane 14 whose locus is the axis of rod 12. A radiation detector D, indicated by the numeral 16, is located on the diametrically opposite side of the rod. The detector 16 is adapted to provide an electrical output signal, on line 18, indicative of the average intensity of radiation incident on the detector. Line 18 is connected to one terminal of a suitable indicating meter 20 responsive to the detector output signal. The other terminal of the meter is connected to a bucking signal source (B.S.S.), indicated by the numeral 22, adapted to provide a reference output signal in opposition to the detector output signal and having a manually variable magnitude determined by the setting of a control dial 24.

According to one variation of a common procedure for investigating the flutter effect, when the rod 12 is located with its axis in the plane 14, the voltage source 22 is adjusted by means of dial 24 until the bucking signal is equal and opposite to the detector output, whereby the meter 20 will indicate zero in the center of its scale. The rod is then moved various measured distances perpendicular to plane 14, and a plot of the meter deviation as a function of the rod position produces the flutter curve 26 of FIG. 2 having the characteristics previously described.

Figure 3:
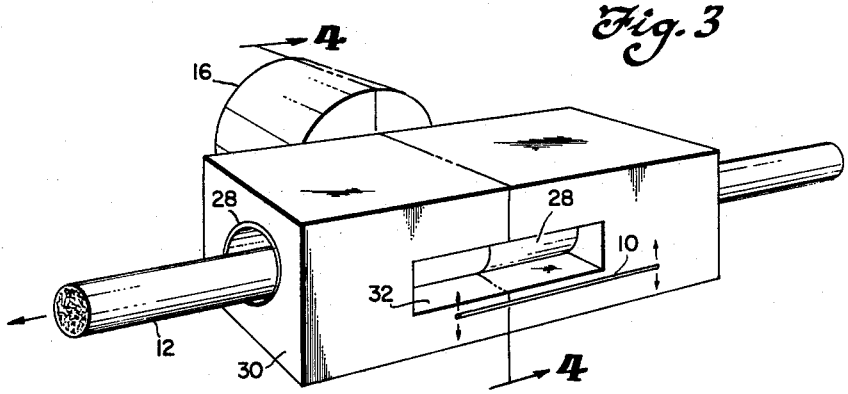
FIG. 3 is a perspective diagram showing the relationship of the basic structural elements of a commercial radiation gauge geometry in accordance with the invention.
Figure 4:
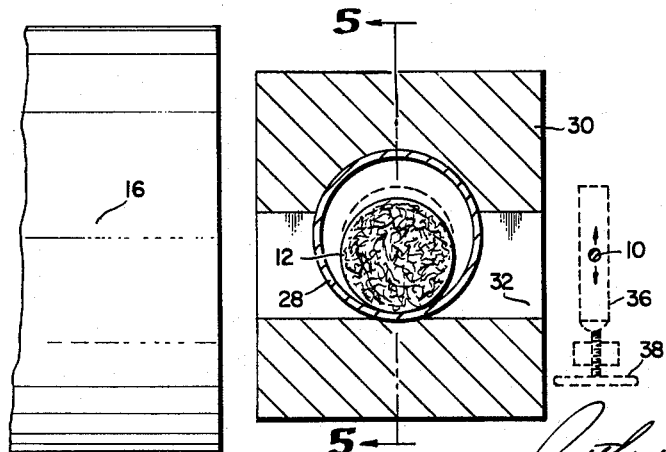
FIG. 4 is a section on the line 4—4 of FIG. 3, said line depicting the intersection of the elements thereof with a cutting plane passed centrally and transversely through the block 30.
Figure 5:
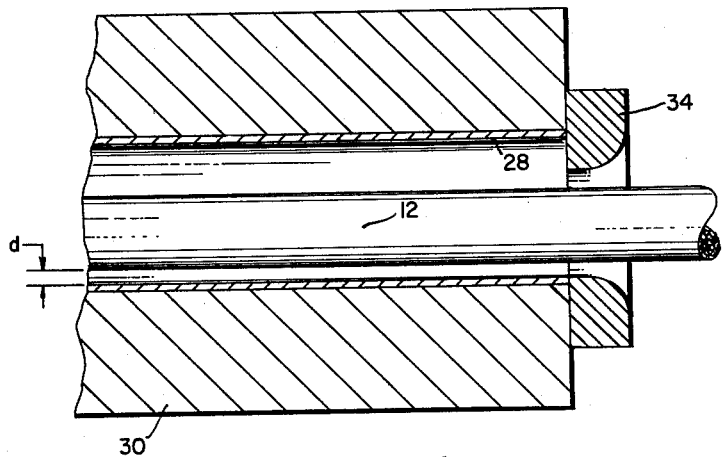
FIG. 5 is a section on the line 5—5 of FIG. 4.

Referring to FIGS. 3–5, in one form of a commercial gauge in accordance with the invention, the rod 12 travels through an integral, thin-walled pass tube 28 which is considerably larger than the rod. The pass tube extends through the matching axial bore of a block 30 of shielding material having a transverse slot 32 therethrough for collimating the radiation beam in the region between the line source 10 and the detector 16. Since the rod "rides" near the bottom of the pass tube, the slot 32 is generally symmetrical about the axis of the path of the rod, rather than being symmetrical about the axis of the pass tube.

In FIG. 5 there is shown a rod guide 34 at the entrance to the pass tube, and it is understood that a similar rod guide (not shown) may also be placed at the exit end of the pass tube. The rod guide has a trumpet-shaped opening therethrough for limiting the permissible flutter movement of the rod, and in the case of a cigarette rod there is a nominal diametrical clearance of about 0.030 inch between the rod and the guide.

Figure 2:
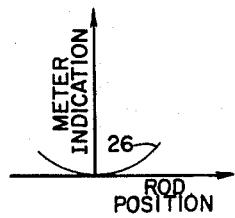
FIG. 2 is a graph showing the flutter curve obtained by the apparatus of FIG. 1.

In view of the off-center location of the rod 12 and the slot 32 with respect to the pass tube 28, it is obvious that the basic symmetry of the FIG. 2 flutter curve is altered. As was pointed out hereinabove, as a practical matter some asymmetry of the radiation field and the flutter curve obtains even when all reasonable attempts are made to provide a symmetric design which is less satisfactory in view of other considerations. For example, we find that the relatively large-diameter pass tube tends to maintain better air circulation and thereby minimize moisture collection in the tube, and that allowing the rod to ride the bottom of the pass tube dampens the normal oscillations or "whipping" of the rod between the end-guides and tends to wipe the pass tube clean of loose particles which may be carried by the rod.

In any case, optimum flutter tuning can be achieved by moving the line source perpendicularly to plane 14 of FIG. 1, such movement being indicated by the short arrows in FIGS. 3 and 4. To this end, in a laboratory device for determining the parameters of a new gauge design, we have provided the arrangement shown by the dotted lines in FIG. 4, comprising a vertically movable source holder 36 which is adjustable by a micrometer thumbscrew 38.

Figure 6:
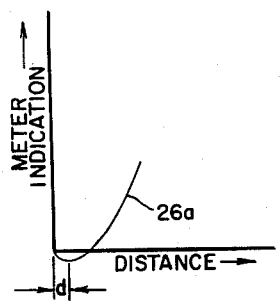
FIG. 6 is a graph showing a typical flutter curve obtained by the method of the present invention.

It is determined from observation of the rod movement on the actual rod-forming process line that an average-diameter rod skims the bottom of the pass tube at a mean distance $d$ therefrom, FIG. 5. Accordingly the optimum flutter tuning is as shown in FIG. 6, where a point of zero slope on the flutter curve 26a obtains when the rod clears the bottom of the pass tube by the distance $d$. The micrometer screw 38 is used to adjust the line source vertically to each of a series of positions, and in each position an individual flutter curve similar to FIG. 6 is obtained. Using the results of these tests, one can readily determine the permanent position of the line source which gives the proper flutter curve as shown in FIG. 6.

Figure 7:
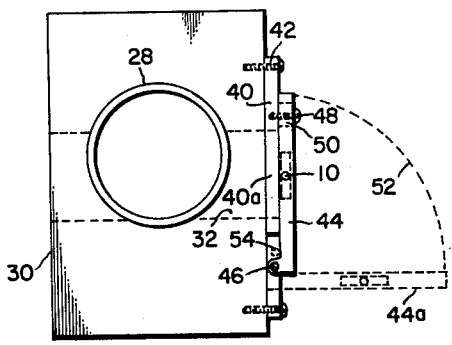
FIG. 7 is a left end view of the block 30 having attached thereto a preferred form of source mounting arrangement.

FIG. 7 shows a preferred source mounting arrangement for production gauges. Herein a base plate 40, having a slot 40a aligned with the slot 32 in the block 30, is secured to the block by screws as at 42. The radioactive line source 10 may be of the type manufactured by the Minnesota Mining and Manufacturing Company, as advertised and described in Nucleonics Magazine, vol. 19, No. 10, October 1961, page 36M. The source is fused and otherwise secured in a hinged flap 44 which is attached to the base plate 40 by hinge pins as at 46 and screws as at 48 passing through vertically slotted openings as at 50 in the flap. When the screws 48 are removed the flap swings downwardly as indicated by the dotted arc 52 to expose the source for inspection.

In the absence of the hinge pins, the screw slots 50 allow vertical movement of the flap 44 and the line source 10 to permit adjustment of the source to a position where the optimum flutter tuning is obtained, thereby locating the point where the holes should be drilled in plate 40 to accommodate the hinge pins 46. The dotted circle 54 indicates an alternate position for the pins.

We are aware that certain prior art arrangements have employed devices resembling the herein described line source for a similar application, and reference can be made in this regard to the Fearnside Patent No. 2,922,884. However, Fearnside teaches that the desired results cannot be obtained with a single source and detector, and he relies on the use of a multiplicity of sources and a multiplicity of detectors, specifically, five sources and five detectors equally spaced around the rod and arranged so that at least three detectors simultaneously respond to the radiation from a given source. Since this and similar disclosures have the effect of leading one directly away from the discovery forming the basis of the present invention, and since the apparatus which has been proposed differs therefrom in many important respects, it is not believed that the existence of such prior art detracts in any way from the novelty of the invention set forth herein.

While only certain specific apparatus and procedures have been described herein, such apparatus and procedures are meant to be illustrative only and not restrictive, since many changes and modifications can obviously be made within the scope of the invention as is set forth in the appended claims.

What is claimed is:

1. A gauging head for measuring the physical properties of an elongated, traveling workpiece in the form of a rod, comprising means for loosely guiding said workpiece for longitudinal movement wherein the central axis of the rod is substantially constrained to a nominal axis of travel, only one line source of nuclear radiation whose cross-sectional dimension is substantially an order of magnitude smaller than the cross-sectional dimension of said workpiece located on one side thereof adjacent to a plane whose locus is said nominal axis of travel, and only one radiation detector located on the diametrically opposite side of said workpiece for providing an output indicative of the average intensity of radiation received by said detector, said line source being parallel to said plane and so positioned that said detector output changes in the same direction when said workpiece axis is moved away from said nominal axis of travel in either direction perpendicular to said plane.

2. A gauging head for measuring the physical properties of an elongated, traveling workpiece in the form of a rod, comprising means for loosely guiding said workpiece for longitudinal movement wherein the central axis of the rod is substantially constrained to a nominal axis of travel, a line source of nuclear radiation located on one side thereof in a plane whose locus is said nominal axis of travel, a radiation detector located substantially on the diametrically opposite side of said workpiece, and means for adjusting the position of said line source in a direction perpendicular to said plane for effecting flutter tuning of the apparatus.

3. A gauging head as in claim 2 wherein said adjusting means comprises a hinge flap having said line source secured therein, mounting means for said hinge flap including means for slidably moving said flap perpendicular to said plane and to any one of a plurality of positions, means for temporarily securing said flap in any of said positions, and a hinge pin for permanently locating the optimum flutter tuning position of said flap, said flap being adapted to swing around said hinge pin to a position making said source accessible for inspection and to swing back to said optimum flutter tuning position.

4. A gauging head for measuring the physical properties of an elongated, traveling workpiece in the form of a rod, comprising a block of shielding material having an elongated opening therethrough larger than the cross-section of said workpiece, a radiation detector mounted on one side of said block, a slot extending through said block from said side to the opposite side of said block and intersecting said opening, a line source of nuclear radiation mounted adjacent said slot at said opposite side for directing a beam of radiation through said slot and across said elongated opening to impinge on said detector, and means for adjusting the position of said source transversely of said slot.

References Cited by the Examiner
UNITED STATES PATENTS

| | | | |
|---|---|---|---|
| 2,884,535 | 4/1959 | Swift | 250—106 X |
| 2,884,539 | 4/1959 | Swift | 250—106 X |
| 2,999,932 | 9/1961 | Spooner | 250—83.3 |
| 3,007,048 | 10/1961 | Knapp et al. | 250—83.3 X |

RALPH G. NILSON, *Primary Examiner.*

ARCHIE BORCHELT, *Examiner.*